(12) United States Patent
Mussack et al.

(10) Patent No.: US 11,319,744 B2
(45) Date of Patent: May 3, 2022

(54) WEATHER STATION MOUNTING FOR HARVESTING MACHINE AND METHOD OF DEPLOYMENT THEREOF

(71) Applicant: DEERE & COMPANY, Moline, IL (US)

(72) Inventors: Jeffery Mussack, Eldridge, IA (US); Gary Knapp, Colona, IL (US)

(73) Assignee: DEERE & COMPANY, Moline, IL (US)

( * ) Notice: Subject to any disclaimer, the term of this patent is extended or adjusted under 35 U.S.C. 154(b) by 390 days.

(21) Appl. No.: 16/391,699

(22) Filed: Apr. 23, 2019

(65) Prior Publication Data

US 2020/0340285 A1 Oct. 29, 2020

(51) Int. Cl.
| | | |
|---|---|---|
| *E05F 11/00* | (2006.01) | |
| *E05F 15/614* | (2015.01) | |
| *A01D 41/12* | (2006.01) | |
| *G01W 1/02* | (2006.01) | |
| *E05F 15/53* | (2015.01) | |
| *E05F 15/70* | (2015.01) | |
| *F16H 19/00* | (2006.01) | |

(52) U.S. Cl.
CPC ........ *E05F 15/614* (2015.01); *A01D 41/1208* (2013.01); *G01W 1/02* (2013.01); *E05F 15/53* (2015.01); *E05F 15/70* (2015.01); *E05Y 2201/434* (2013.01); *E05Y 2201/448* (2013.01); *E05Y 2201/71* (2013.01); *E05Y 2400/45* (2013.01); *E05Y 2900/518* (2013.01); *F16H 19/001* (2013.01)

(58) Field of Classification Search
CPC . A01D 41/127; A01D 41/1208; E05F 15/614; E05F 15/70; E05F 15/53; G01W 1/02; E05Y 2201/71; E05Y 2201/434; E05Y 2201/448; E05Y 2400/45; E05Y 2900/518; F16H 19/001
USPC .......................................... 49/324, 325, 326
See application file for complete search history.

(56) References Cited

U.S. PATENT DOCUMENTS

| | | |
|---|---|---|
| 2,329,200 A | 9/1943 | Hefele |
| 2,367,164 A | 1/1945 | Yerger, Jr. |
| 3,873,985 A | 3/1975 | Altmayer |
| 5,164,739 A | 11/1992 | Koide et al. |
| 5,709,394 A * | 1/1998 | Martin ................ B60G 17/005 180/41 |
| 6,906,684 B2 | 6/2005 | Turner |
| 7,561,102 B2 | 7/2009 | Duvall |
| 8,924,030 B2 | 12/2014 | Wendte et al. |

(Continued)

*Primary Examiner* — Chi Q Nguyen
(74) *Attorney, Agent, or Firm* — Taft Stettinius & Hollister LLP; Stephen F. Rost

(57) ABSTRACT

A harvesting machine includes a chassis, a ground-engaging mechanism for supporting the chassis, and a tank assembly mounted to the chassis for storing a crop material. The tank assembly includes a retractable door for at least partially covering an opening formed in a top of the tank assembly. A mobile sensor assembly includes a rod and a sensor for detecting a weather condition, such that the rod includes a first end coupled to the retractable door and a second end to which the sensor is coupled. The retractable door is operably moved between an open position and a closed position, and the mobile sensor assembly is rotatably moved between a deployed position and a stowed position as the door is moved between the open and closed positions, respectively.

20 Claims, 10 Drawing Sheets

(56) References Cited

U.S. PATENT DOCUMENTS

| | | |
|---|---|---|
| 9,425,499 B2 | 8/2016 | Nishimura |
| 9,882,272 B2 | 1/2018 | Wyckoff et al. |
| 2006/0240884 A1* | 10/2006 | Klimmer ............ A01D 41/1275 460/119 |
| 2009/0192654 A1 | 7/2009 | Wendte et al. |
| 2014/0302897 A1* | 10/2014 | Isaac .................... A01D 41/127 460/111 |
| 2017/0245434 A1* | 8/2017 | Jung ................. A01B 63/1006 |
| 2018/0317388 A1* | 11/2018 | Gresch ................ A01B 79/005 |
| 2018/0332767 A1* | 11/2018 | Muench ................. A01D 57/04 |
| 2019/0021226 A1* | 1/2019 | Dima ................... A01D 41/127 |
| 2019/0090428 A1* | 3/2019 | Rittershofer .......... A01F 12/442 |
| 2019/0150357 A1* | 5/2019 | Wu ....................... A01C 21/00 |
| 2020/0337233 A1* | 10/2020 | Groves ................ A01D 41/141 |

* cited by examiner

WEATHER STATION MOUNTING FOR HARVESTING MACHINE AND METHOD OF DEPLOYMENT THEREOF

FIELD OF THE DISCLOSURE

The present disclosure relates to a harvesting machine, and in particular, to a weather station mounting for the machine and the method of deployment thereof.

BACKGROUND

Agricultural harvesting machines, such as a combine, include different portions or sections for moving crop therethrough. For example, a conventional combine may include a cleaning shoe or system that is located between the wheels of the combine, behind the cab and below the engine. The design of the cleaning system is such that a large fan or blower provides air driven upward therefrom. The cleaning system may include grating in the form of a large cylindrical or semi-circular body through which grain and other residue falls through and onto a cleaning shoe (or sieve). Air from the blower is generated upward through the flat grating and cleaning shoe and lifts material other than grain ("MOG") such as straw and carries the material to the rear of the combine on a flow of air. Grain that falls through a large flat screen of the cleaning system may collect near a bottom of the combine where it is lifted up by the air flow and deposited into a grain tank. The MOG is further carried by the air flow over the top of the sieve and to the rear of the combine where it is deposited onto the underlying ground. The MOG, which is carried by the air flow to the rear of the combine, may be spread on the ground or otherwise deposited on the ground in a narrow windrow or swath where it is later picked up.

With the MOG and other debris being churned up by the machine, it is desirable to be able to manage the debris. To do so, it is helpful to understand the surrounding weather conditions such as temperature, humidity, wind speed, and wind direction. This is particularly helpful for managing the cooling performance of the work machine and also to better understand what is happening to the MOG after it exits the machine.

SUMMARY

In one embodiment of the present disclosure, a harvesting machine includes a chassis; a ground-engaging mechanism for supporting the chassis; a tank assembly mounted to the chassis for storing a crop material, the tank assembly including a retractable door for at least partially covering an opening formed in a top of the tank assembly; and a mobile sensor assembly comprising a rod and a sensor for detecting a weather condition, the rod including a first end coupled to the retractable door and a second end to which the sensor is coupled; wherein, the retractable door is operably moved between an open position and a closed position; wherein, the mobile sensor assembly is rotatably moved between a deployed position and a stowed position as the door is moved between the open and closed positions, respectively.

In one example of this embodiment, in the closed position, the mobile sensor assembly is located in the tank assembly. In a second example, between the deployed position and the stowed position, the mobile sensor assembly is rotatably moved between 60-120°. In a third example, the mobile assembly is rotatably moved less than 100°. In another example, the mobile sensor assembly comprises an antenna, a camera, or a global positioning sensor.

In a fourth example, a shaft is rotatably driven by a drive mechanism, the shaft operably coupled to the door for rotating the door between its open and closed positions. In a fifth example, the mobile sensor assembly is coupled to the shaft, the mobile sensor assembly rotatably driven by the shaft between its deployed and stowed positions. In a sixth example, as the retractable door is rotatably driven between its open and closed positions, the shaft rotates greater than 100° and the mobile sensor assembly is rotated less than 100°. In a seventh example, a machine controller is disposed in communication with the drive mechanism for operably controlling a rotational movement of the shaft and automatically moving the mobile sensor assembly between its deployed and stowed positions.

In an eighth example, a stop assembly includes a first stopper mechanism and a second stopper mechanism; wherein, in the deployed position, the rod engages the first stopper mechanism to prevent further rotational movement of the mobile sensor assembly; wherein, in the stowed position, the rod engages the second stopper mechanism to prevent further rotational movement of the mobile sensor assembly. In a ninth example, a sleeve receives the rod in the deployed position. In another example, the rod is coupled to a block member, the block member including a stopper block and an opening formed in the block member for receiving the shaft; the block member and rod being pivotable relative to the shaft such that the shaft rotates a greater angular distance than the mobile sensor assembly. In a further example, the drive mechanism comprises a hydraulic actuator or an electric motor. In yet a further example, the machine comprises a maximum height defined between a ground surface upon which the ground-engaging mechanism contacts and an uppermost location on the machine; wherein, in the deployed position, the sensor is located at a height greater than the maximum height.

In another embodiment of the present disclosure, a method of controlling a mobile sensing device located on a harvesting machine to a deploy position for detecting a weather condition includes providing the harvesting machine with a controller, a chassis, and a tank assembly mounted to the chassis, the tank assembly including a retractable door to which the mobile sensing device is coupled; determining the harvesting machine is functioning in a field operating condition; opening the retractable door; deploying the mobile sensing device from a stowed position to the deployed position at approximately the same time as the retractable door is opened to its open position.

In one example of this embodiment, the method may include controllably rotating a shaft via the controller for opening the retractable door and deploying the mobile sensing device in an automated manner. In another example, the method may include closing the retractable door; and rotatably moving the mobile sensing device from the deployed position to a stowed position. In yet another example, the method may include positioning the mobile sensing device within the tank assembly and at least partially enclosing it when the retractable door is closed.

In a further embodiment of the present disclosure, a harvesting machine includes a chassis; a ground-engaging mechanism for supporting the chassis; a tank assembly mounted to the chassis for storing a crop material, the tank assembly including a plurality of retractable doors for at least partially enclosing the tank assembly; a drive assembly including a shaft operably coupled to at least one of the plurality of retractable doors, the drive assembly operably driving the at least one retractable door between an open position and a closed position; a mobile sensor assembly comprising a rod, a sensor for detecting a weather condition, and a stop assembly for limiting rotational movement of the mobile sensor assembly, the rod including a first end coupled to the shaft and a second end to which the sensor is coupled; wherein, the mobile sensor assembly is rotatably moved between a deployed position and a stowed position at approximately the same time as the door is moved between the open and closed positions, respectively.

In one example of this embodiment, as the retractable door is rotatably driven between its open and closed positions, the shaft rotates greater than 100° and the mobile sensor assembly is rotated less than 100°. In another example, the stop assembly comprises a first stopper mechanism and a second stopper mechanism; wherein, in the deployed position, the rod engages the first stopper mechanism to prevent further rotational movement of the mobile sensor assembly; wherein, in the stowed position, the rod engages the second stopper mechanism to prevent further rotational movement of the mobile sensor assembly.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
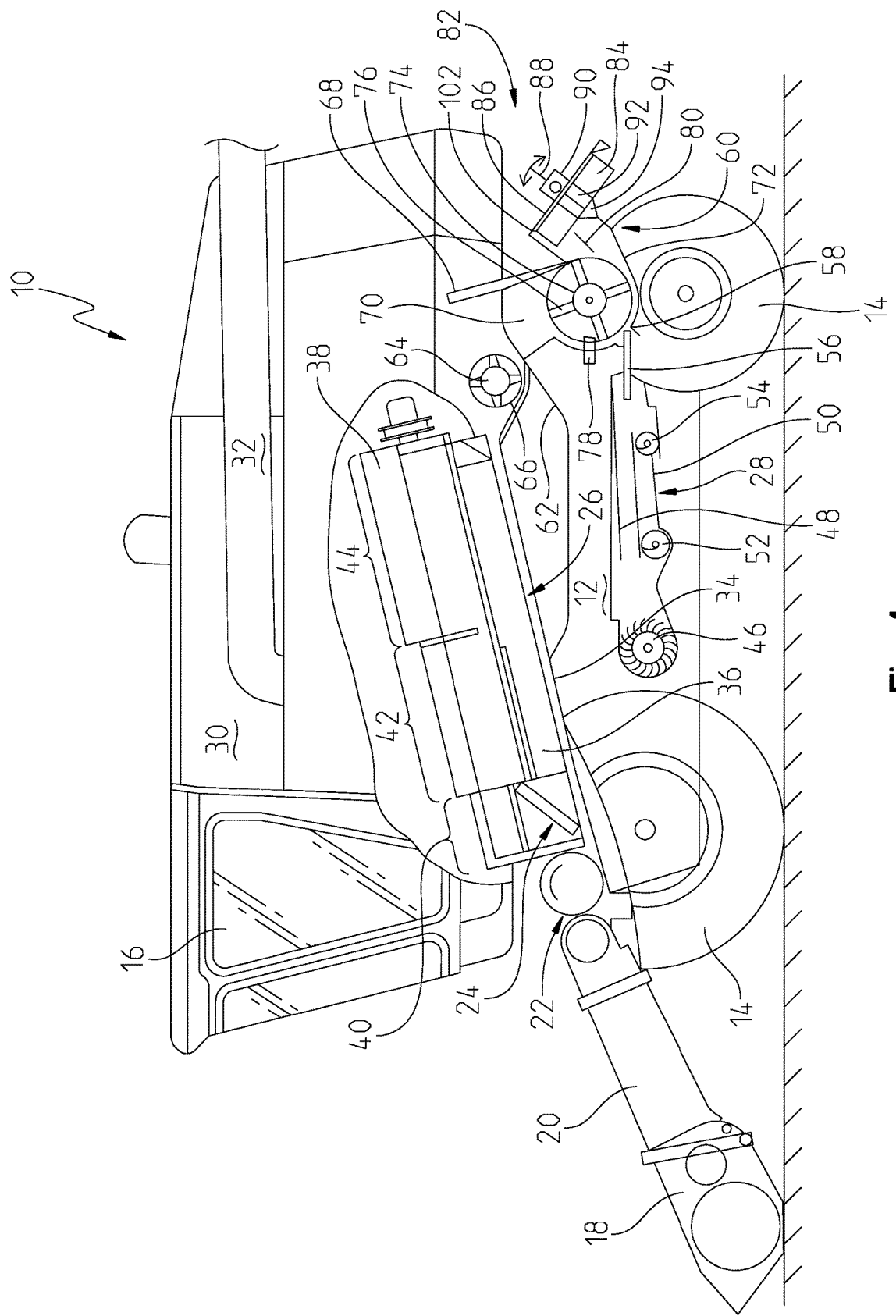
FIG. 1 is a partial section of a side view of a combine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The harvested crop is conducted through a slope conveyor 20 and over a guide drum 22. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn or grain (not shown). The elevator for clean corn deposits the clean corn in a corn or grain tank 30, as shown in FIG. 1. The clean corn or grain in the tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

It is often desirable with harvesting machines and other work machines to be able to collect and understand the surrounding environment, including the weather. For instance, it can allow for improved machine performance and the data collected may be used to adjust machine settings during operation. A weather monitoring system may be installed on the harvesting machine to collect this type of data. While this technology is not new, conventional systems are fixedly attached to the machine at a location where the sensing elements cannot be damaged during field operation or road transport. Moreover, conventional systems require an operator of the machine to activate the sensing technology, and in most cases, deploy the system for collecting the data. This, however, can be problematic as many operators either forget to deploy the system or refuse to do so.

Further, many systems are located on the machine at locations where the machine may obstruct the technology from collecting accurate data. For example, if the system is mounted in a location where the cab or other structure of the machine can partially block the wind, the sensing technology may not be able to detect an accurate reading of wind speed or direction. Thus, there is a need for an improved weather detection system that can be automated or semi-automated, and further disposed in a location where it is capable of collecting accurate data to improve machine performance.

Figure 2:
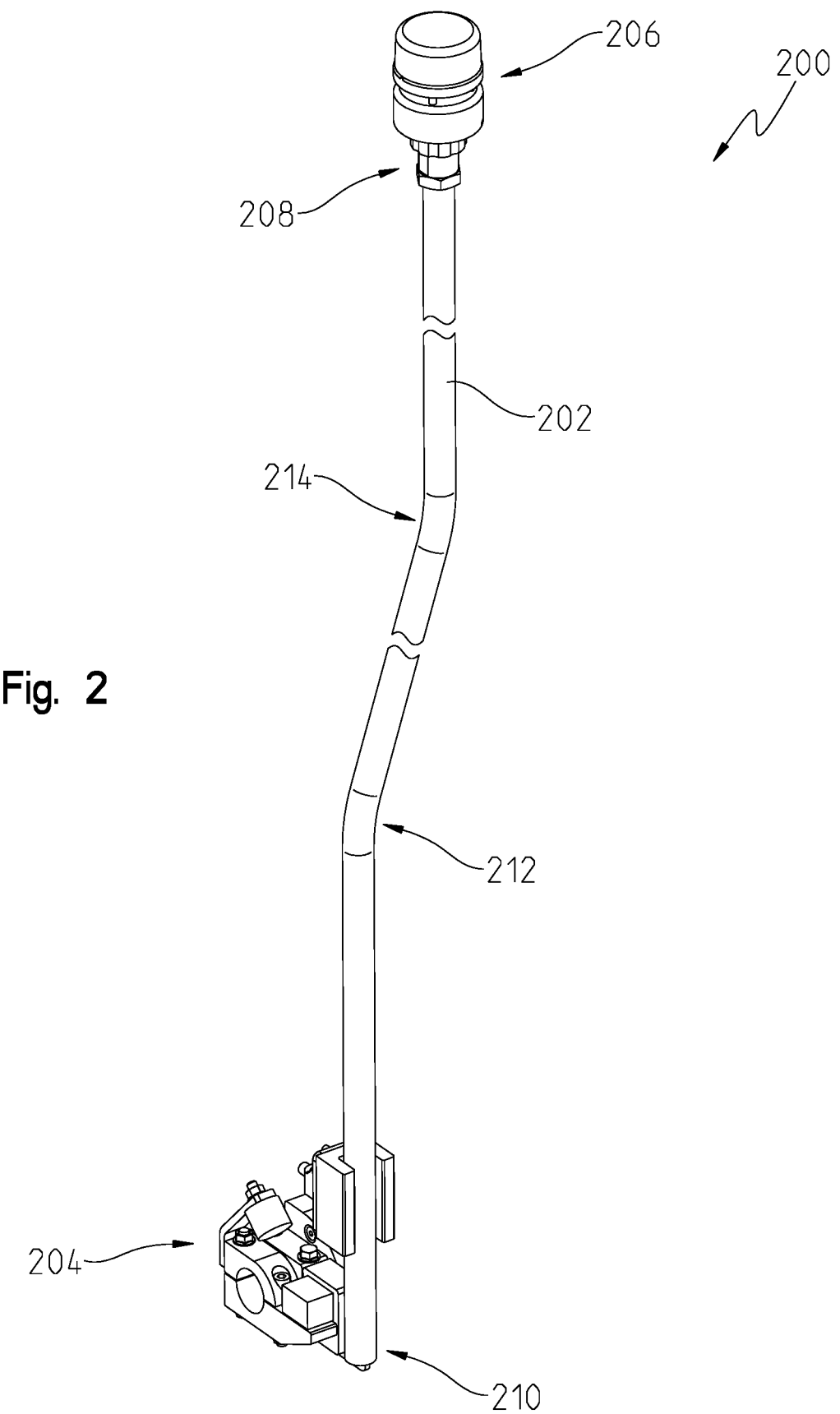
FIG. 2 is a perspective view of a weather station mounting assembly.

Referring to FIG. 2, one embodiment of an environmental sensing assembly is illustrated. The environmental sensing assembly 200 may be in the form of a weather station system capable of detecting a temperature, humidity, wind speed, wind direction, barometric pressure, etc. The assembly 200 may include an elongated rod 202 formed of aluminum, plastic, steel or other robust material. The rod 202 may include a first end 208 and a second end 210. In one example, the rod 202 may be substantially straight from the first end 208 to the second end 210. In another example, the rod 202 may include a plurality of bends. For instance, in FIG. 2, the rod 202 is shown having a first bend 212 and a second bend 214. The number of bends is not relevant to the present disclosure and may be any number including zero.

The rod 202 may have a length that allows it to extend above the machine during a field operation. In one non-limiting example, the rod 202 may have a length between 1-12 feet. In another example, the rod 202 may have a length between 3-10 feet. In a further example, the rod 202 may have a length between 5-8 feet. In yet another example, the rod 202 may include a length between 5-7 feet. In yet a further example, the rod 202 may have a length of approximately 6 feet plus or minus a few inches. The exact length of the rod 202 is immaterial to the present disclosure so long as when it is in its deployed position, the sensor assembly 206 is able to detect the surrounding environment including weather characteristics such as temperature, humidity, barometric pressure, wind speed, wind direction, etc., without any obstruction by the machine.

A sensor assembly 206 may be coupled to the first end 208 of the rod 202. The sensor assembly 206 may be any type of sensor capable of detecting a weather condition. Moreover, the sensor assembly 206 may further include a transmitter for transmitting the detected weather condition to a controller on the machine or to a control system remotely located relative to the machine.

In an alternative embodiment, the sensor assembly 206 may include a radio antenna for receiving or transmitting signals. In a further embodiment, the sensor assembly may include a camera capable of taking photographs of the machine or areas around the machine, or taking video and transmitting the video to the cab where the operator is able to visually observe areas on and around the machine. The sensor assembly may further include a global positioning sensor for detecting a location or communicating a location of the machine in a given area of a field.

Figure 6:
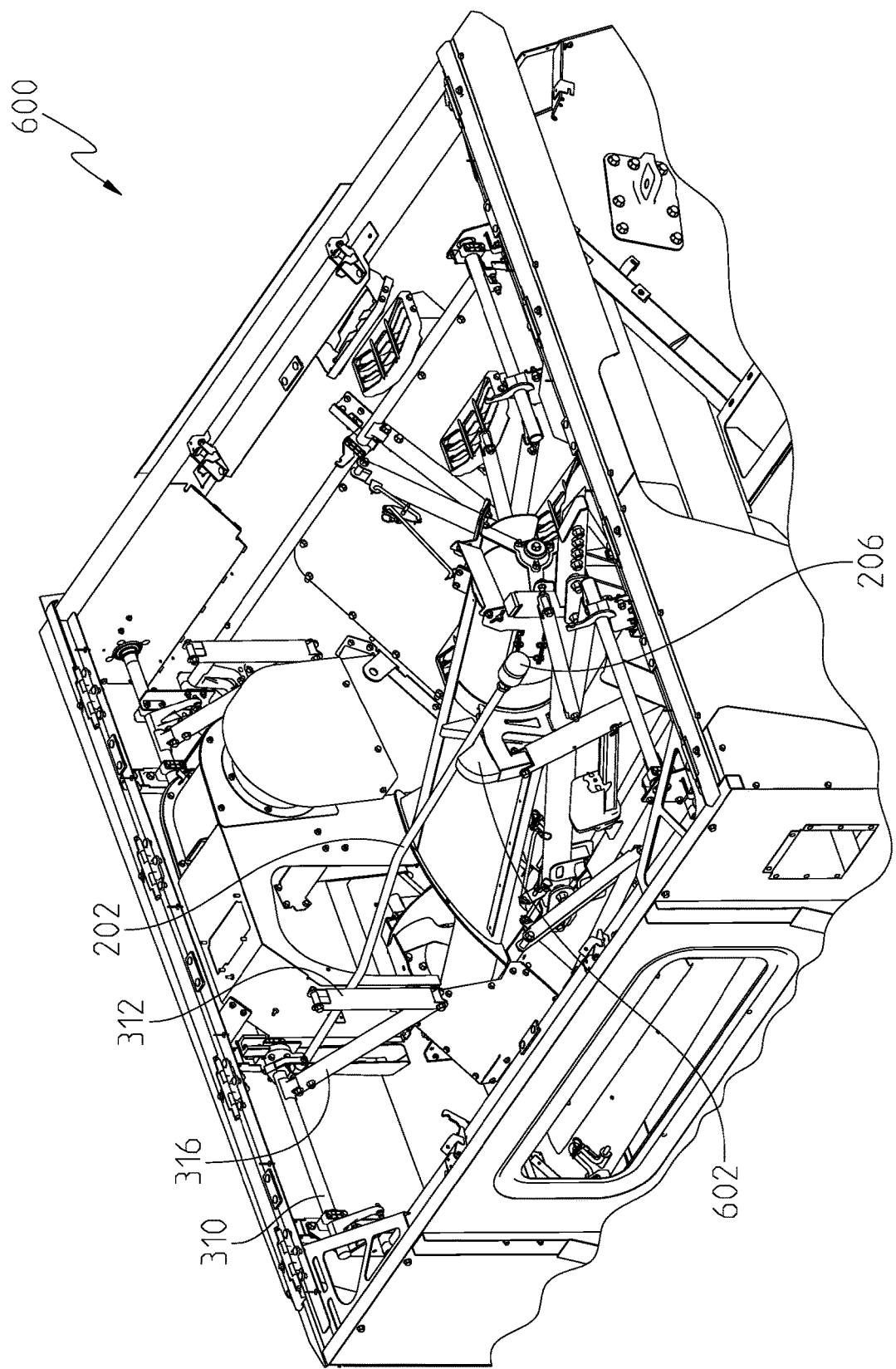
FIG. 6 is a partial perspective view of a tank on a harvesting machine with the weather station mounting assembly of FIG. 2 in its stowed position.

The assembly 200 may also include a stopper assembly 204, which will be described in greater detail below. The stopper assembly 204, however, may be designed to limit the rotational movement of the rod 202 between a first, deployed position (FIG. 3) and a second, stowed position (FIG. 6).

Figure 3:
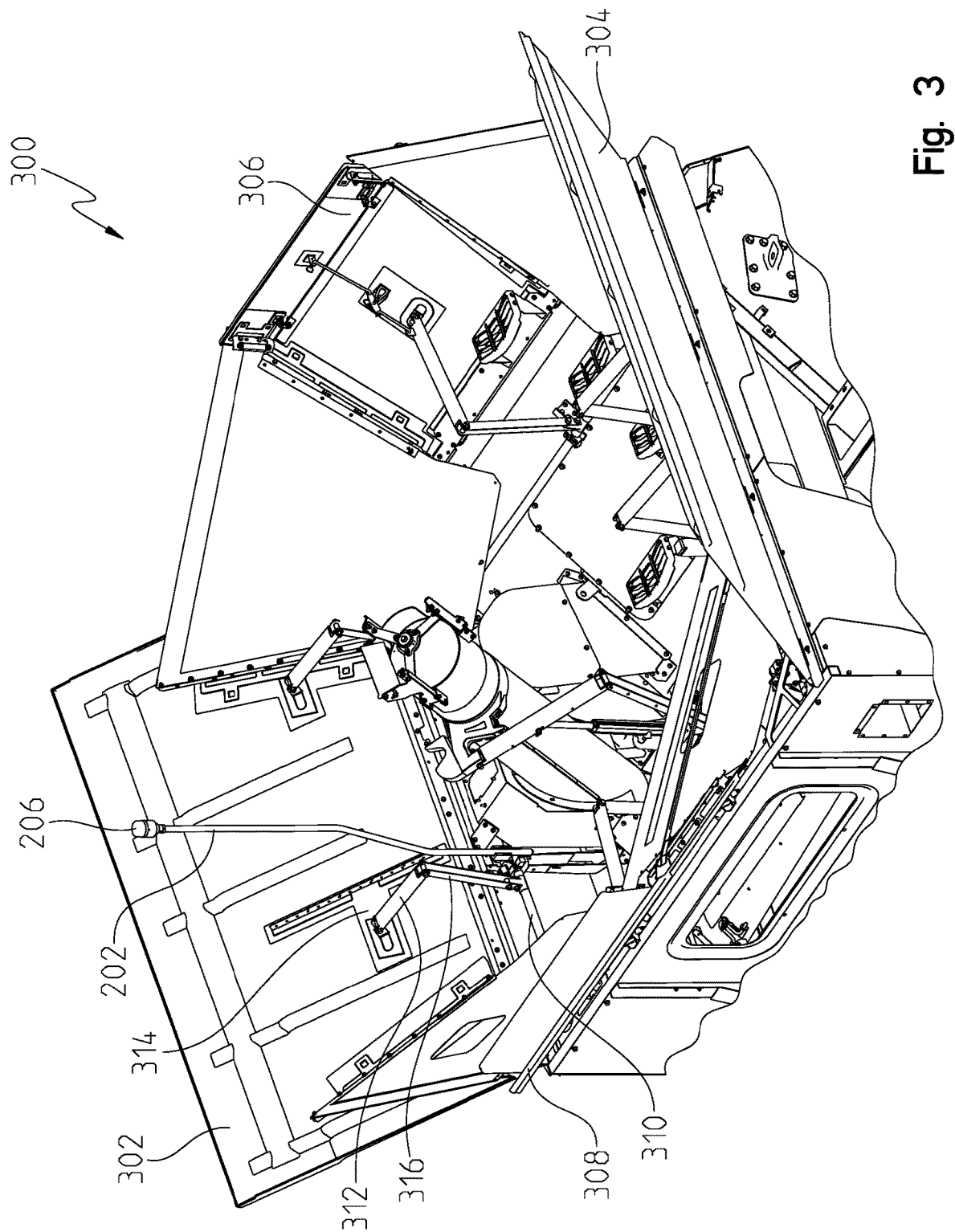
FIG. 3 is a partial perspective view of a tank on a harvesting machine with the weather station mounting assembly of FIG. 2 in its deployed position.

Turning to FIG. 3, the environmental sensing assembly 200 is shown coupled to a tank near the top of a harvesting machine. In FIG. 1, for example, the environmental sensing assembly 200 may be coupled to the corn or grain tank 300. The tank is shown in an open configuration 300 which is the case usually when the machine is in a field operation condition. The tank may include a plurality of doors which may be disposed in an open or closed position. In FIG. 3, the plurality of doors includes a first door 302, a second door 304, a third door 306, and a fourth door 308. Here, the plurality of doors are shown in their open position.

In this embodiment, the environmental sensing assembly 200 is shown configured in a deployed or upright position. Although not shown due to the orientation of FIG. 3, the sensor assembly 206 may be located at a height that is taller than the plurality of doors. Moreover, the sensor assembly 206 may be located at a peak height location relative to the rest of the machine. This, of course, may be desirable as the machine is unable to block or obstruct the sensor assembly 206 from detecting true measurements of the weather and other environmental conditions. At times, grain or other material may completely fill the tank and extend above the tank. It is desirable for the sensor assembly 206 to be located above the peak of the grain or corn disposed in the tank. Further, the quality of the air at this peak height location may be better and thus the sensor assembly 206 is able to detect air characteristics including wind direction and velocity for improved cooling package performance.

As also shown in FIG. 3, the environmental sensing assembly 200 may be movably coupled to one of the plurality of doors of the tank. Here, the assembly 200 is coupled to the first door 302. In particular, the assembly 200 is coupled to a rock or drive shaft 310 that operably drives the first door 302 between its open position (FIG. 3) and its closed position. In one example, the shaft 310 can rotate between 45-225°. In another example, the shaft 310 may rotate between 75-200°. In a further example, the shaft 310 may rotate between 100-175°. In yet a further example, the shaft 310 may rotate between 125-150°. In yet another example, the shaft may rotate between 130-140°.

A pair of linkages may be coupled to the shaft to assist with opening and closing the plurality of doors. In FIG. 3, for example, a first link 312 and a second link 316 are shown. The first link 312 may be coupled to a support member 314 which is positioned on the first door 302. The second link 316 may be pivotally coupled to the first link 312. Moreover, the second link 316 may be rotatably coupled to the shaft 310. Although not shown, a drive mechanism such as a hydraulic or electric actuator may operably rotate the shaft 300 about a rotation axis.

In FIG. 3, the plurality of doors may also be referred to as covers. The doors or covers may be automatically controlled between their open and closed positions by a machine controller that controls the operation of the machine. For example, the controller may detect that the harvesting machine is functioning in a field operation, and therefore triggers the plurality of doors or covers to open. For purposes of this disclosure, field operation may occur when the separator is engaged. The machine has been started for processing grain, corn or other crop, and the plurality of doors or covers are opened under this condition. When the plurality of doors or covers are opened, the environmental sensing assembly 200 will be rotated to its deployed position 300 of FIG. 3. By contrast, when the machine is functioning in a transport condition, the plurality of doors or covers may be automatically closed by the controller. Thus, the operator is not required to enable or disable the functioning of the environmental sensing assembly 200—it is automatically deployed upon opening the plurality of doors or covers in this embodiment.

Figure 4:
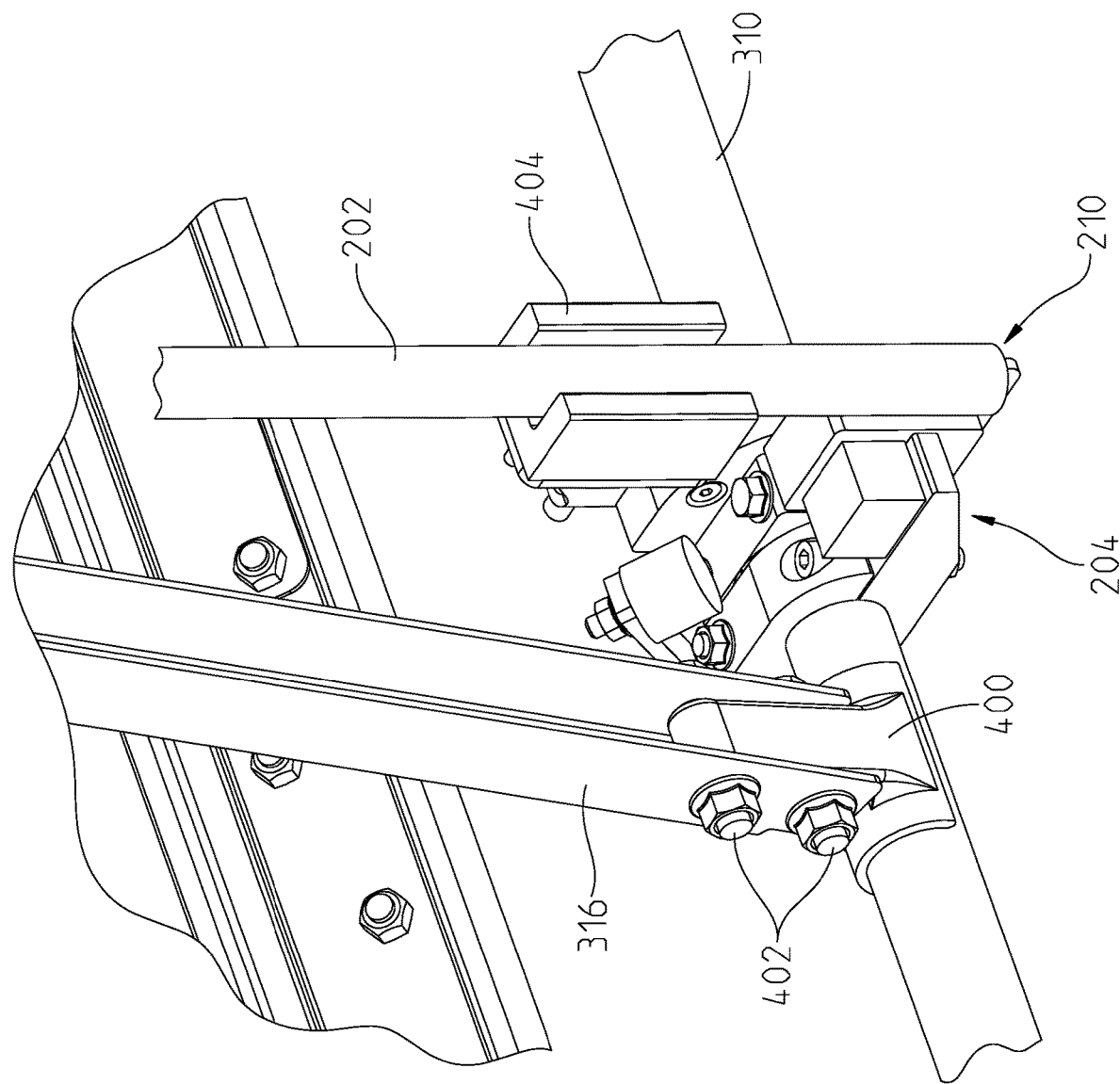
FIG. 4 is a partial perspective view of a rotational drive of the weather station mounting assembly of FIG. 2.
Figure 5:
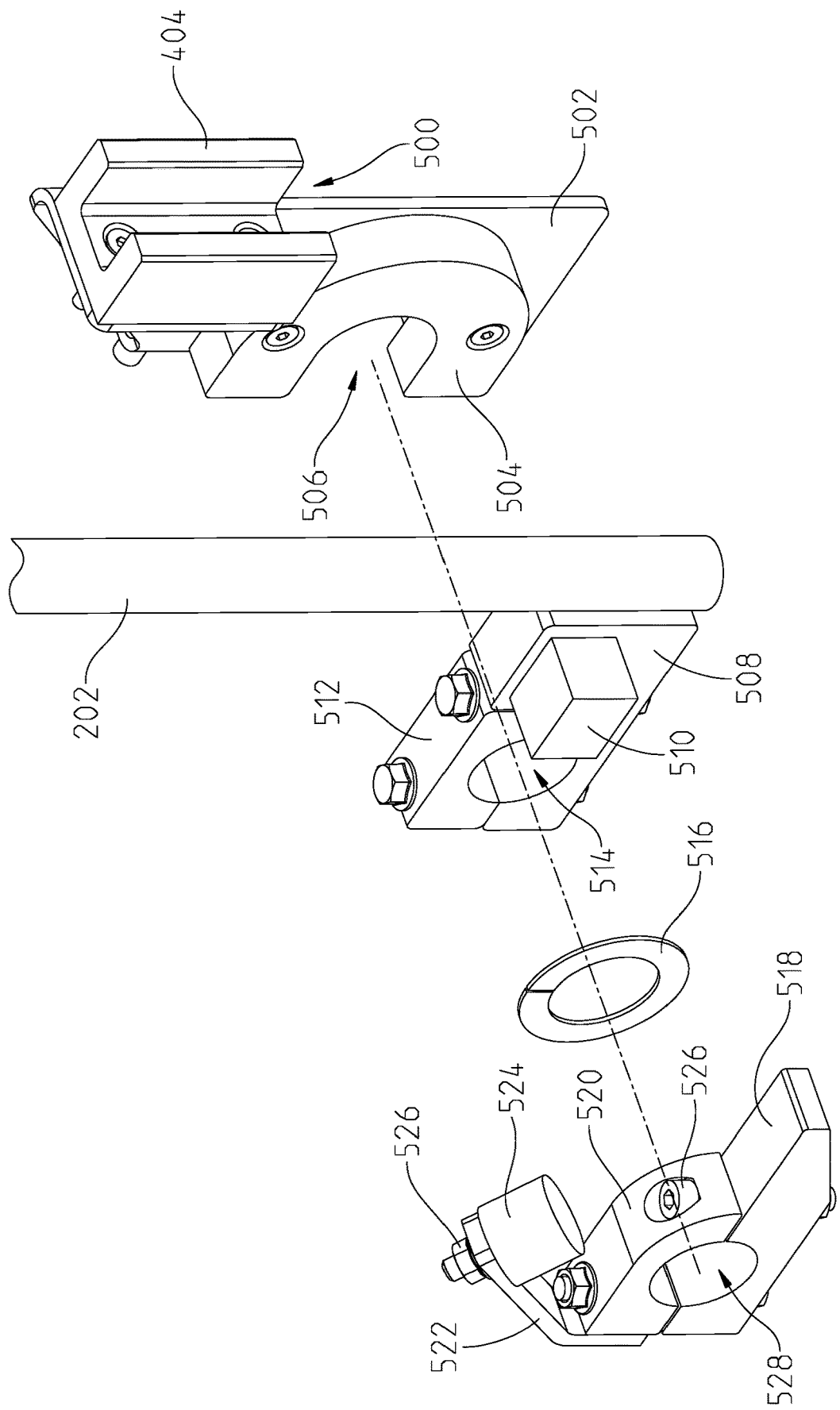
FIG. 5 is a perspective and exploded view of a portion of the rotational drive of the weather station mounting assembly of FIG. 2.

Referring now to FIGS. 4 and 5, the stopper assembly 204 is shown in greater detail. Here, the second link 316 is coupled to the drive shaft 310 via a plurality of fasteners 402 which engage a shaft coupler 400 attached to the shaft 310. The second link 316 is able to pivot or rotate relative to the shaft 310 in one embodiment. In an alternative embodiment, the shaft coupler 400 may be fixed to the shaft 310.

In the deployed position, the rod 202 may be located within a sleeve 404, as shown, which supports the rod 202 and can limit its movement in a fore-and-aft direction. Moreover, in the deployed position 300 of FIG. 3, the sleeve 404 receives the rod 202 and limits the rod's movement any further regardless of whether the shaft 310 continues to rotate. The sleeve 404 may be formed of a plastic material and include a defined opening 500 for receiving the rod 202. The sleeve 404 may be coupled to a plate 502 at a location above the shaft 310 when viewed in the deployed position 300. A C-member 504 may be coupled to the plate 502 via one or more fasteners, and the C-member 504 defines a shaft opening 506 as shown.

The rod 202 may be coupled to a block member 508. In one example, the rod 202 may be welded or adhered to the block member 508. In another example, a clamp or bracket may be used to couple the rod 202 to the block member 508. In any event, a cap 512 may be coupled to the block member 508 and define a shaft opening 514 through the cap 512 and block member 508. A stopper block 508 may be further coupled to a side wall of the block member 508, as shown in FIG. 5.

The stop assembly 204 may also include a foot member 518 with a coupler 520 attached thereto. For instance, one or more fasteners 526 may couple the coupler 520 to the foot member 518. An arm 522 may be coupled to the coupler 520, the foot member 518, or both via one or more fasteners (not shown). A stopper 524 may be coupled to the arm 522 via a fastener 526, as shown in FIG. 5. The stopper 524 may be formed of an elastic or rubber material. The type of material of the stopper 524 may be any type of material for limiting movement of the rod 206 in the stowed position.

When the stop assembly 204 is assembled, a washer 516 may be disposed between the foot member 518 and coupler 520 and the cap 512 and block member 508. A shaft opening 528 is formed between the coupler 520 and foot member 518 such that the drive shaft 310 can be positioned within the shaft openings 506, 514, 528 shown in FIG. 5.

For purposes of this embodiment, the foot member 518 may contact the stopper block 510 to maintain the environmental sensing assembly 200 in the deployed position 300. This is shown in FIG. 4.

The present disclosure is not limited to the environment sensing assembly 200 being disposed in its deployed position. At times, the harvesting machine may be in a transport mode where it is traveling between fields or other locations where it is not processing grain or other crop. In this instance, it is desirable to reduce the overall height and width of the machine to meet government regulations. As such, the doors or covers of the grain or corn tank may be closed in the transport mode. As the doors or covers are rotated to their respective closed position, the environmental sensing assembly 200 may also be rotated with the drive shaft 310 to its folded or stowed position.

In FIG. 6, the tank is shown with the machine in its transport mode. For sake of clarity, the plurality of doors or covers have been removed so that the internal components are more easily seen. Here, the environmental sensing assembly 200 is shown rotated via the drive shaft 310 to its stowed position 600. In this position, the rod 202 is no longer received by the sleeve 404, but rather it is received by a catch member 602 located internally of the tank. In this stowed position 600, the environmental sensing assembly 200 is folded downwardly and located beneath the plurality of doors or covers so it is not exposed to power lines, trees, and the like as the harvesting machine travels in transport mode.

Figure 7:
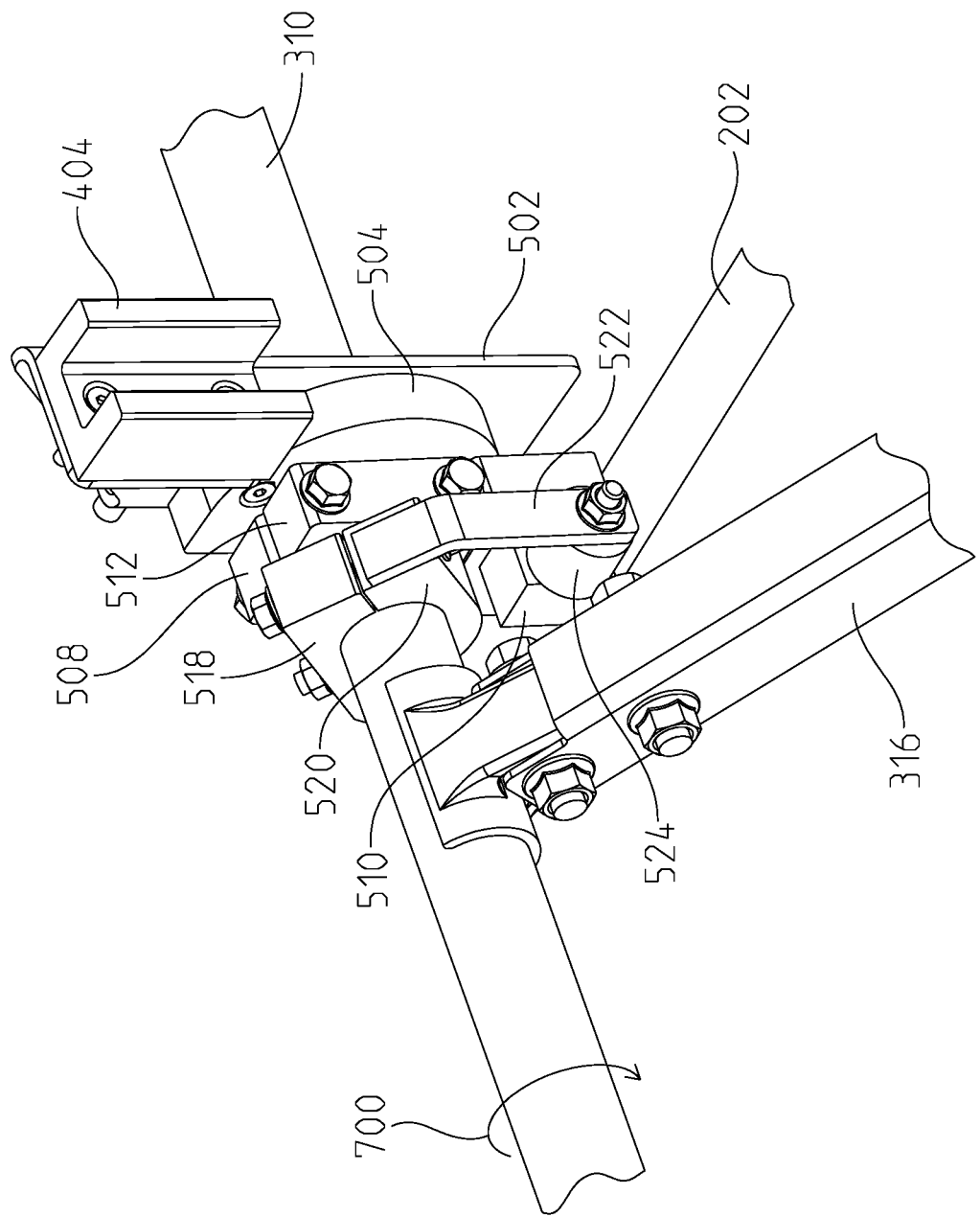
FIG. 7 is a partial perspective view the rotational drive of the weather station mounting assembly in its stowed position.

As described above, in the deployed position the stopper block 510 engages the foot member 518 to limit any further rotation beyond the position shown in FIG. 3. In FIG. 6, and particularly in the stowed position, the stopper block 510 comes into engagement with the stopper 524 which limits further rotational movement beyond the position shown in FIGS. 6 and 7. Thus, the stop assembly 204 may provide for two limits to the rotational movement of the rod 202. Thus, in this embodiment, the cap 512 and stopper block 508 are able to freely pivot relative to or about the drive shaft 310.

In other words, the drive shaft 310 may continue to rotate even after the rod 202 reaches its limits by the foot member 518 and stopper 524 to further open or close the plurality of doors or covers of the tank.

In one embodiment, a controller automatically controls the opening and closing of the plurality of doors or covers of the tank. As such, the controller further controls rotational movement of the environmental sensing apparatus 200 between its deployed position 300 and stowed position 600. The controller is able to do this by controlling the drive mechanism, e.g., hydraulic or electric actuator, which operably rotates the drive shaft 310. In the deployed position 300, for example, the controller may operably control the drive shaft 310 to rotate in a direction indicated by arrow 700 in FIG. 7 to move the environmental sensing assembly to its stowed position 600 of FIG. 6.

In another embodiment, the plurality of doors or covers may be opened or closed semi-automatically or manually. In either case, the environmental sensing assembly 200 may be deployed as the doors or covers are opened, and likewise the assembly 200 may be stowed as the doors or covers are closed. In this embodiment, there is a need for operator interface, but only with respect to opening or closing the doors. The operator is not required to deploy or stow the environmental sensing apparatus 200, as this happens automatically as the doors or covers are moved to their respective orientations.

Figure 8:
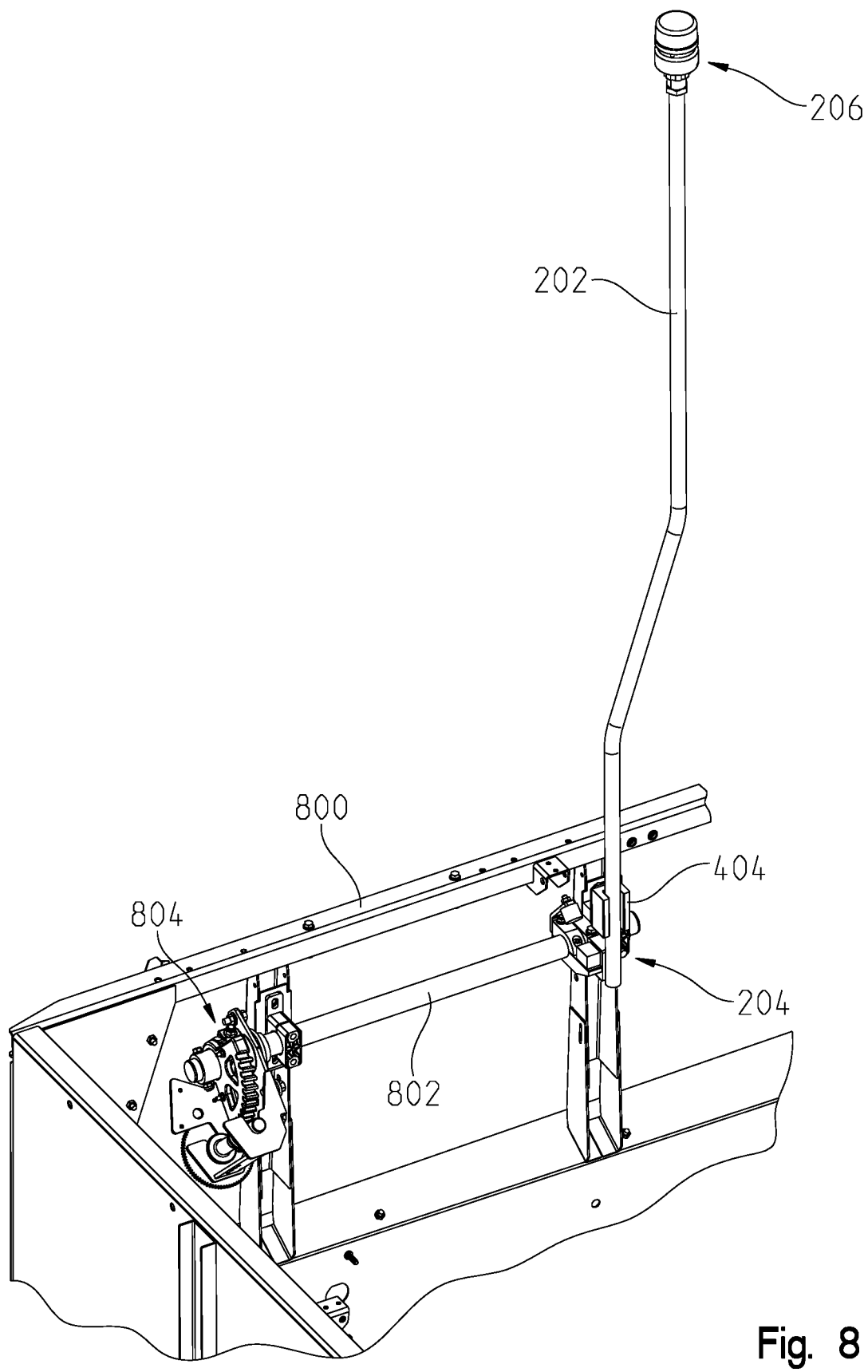
FIG. 8 is a partial perspective view of a second embodiment of a weather sensing assembly coupled to a tank on a harvesting machine.

In FIG. 8, for example, a further embodiment of the present disclosure is shown. Here, a tank 800 such as a grain tank, corn tank or any other tank on a harvesting machine is shown. The tank 800 may include one or more doors or covers that may be disposed in an open or closed position. In FIG. 8, the environmental sensing assembly 200 includes the rod 202 and stop assembly 204. The drive mechanism for controlling movement of the environmental sensing assembly 200 between its deployed and stowed positions may include a drive shaft 802 and a drive assembly 804. The drive assembly 804 may include a worm gear assembly, for example. An electric motor or other electrically-powered mechanism may rotatably drive the shaft 802. Alternatively, a hydraulic, mechanical, pneumatic, or other known drive mechanism may operably rotate the shaft 802. The drive or jack shaft 802 of FIG. 8 may be shorter than the drive shaft 310 of FIG. 3, although this is not required.

Figure 9:
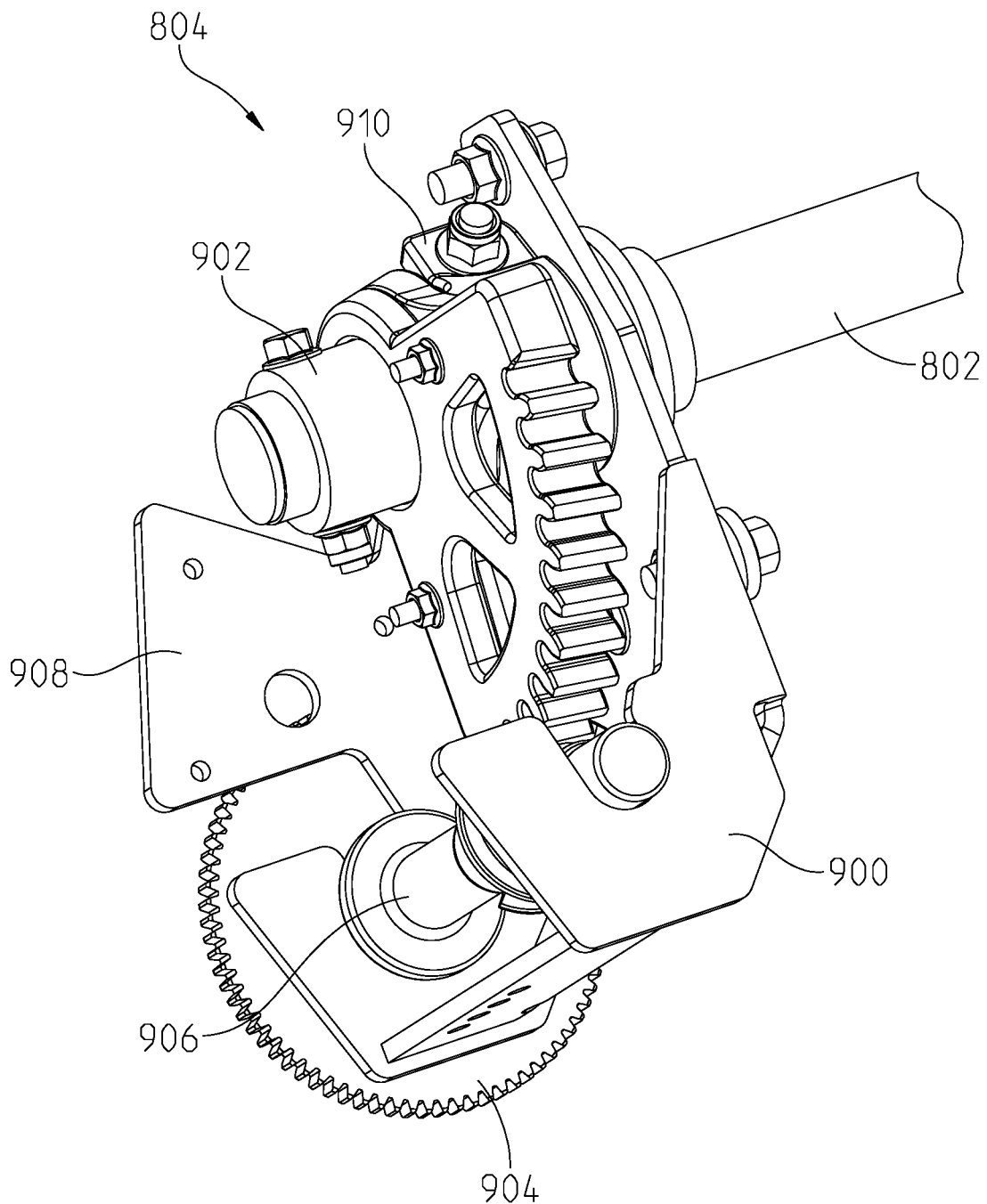
FIG. 9 is a perspective view of a drive mechanism for operably controlling the weather sensing assembly of FIG. 8.
Figure 10:
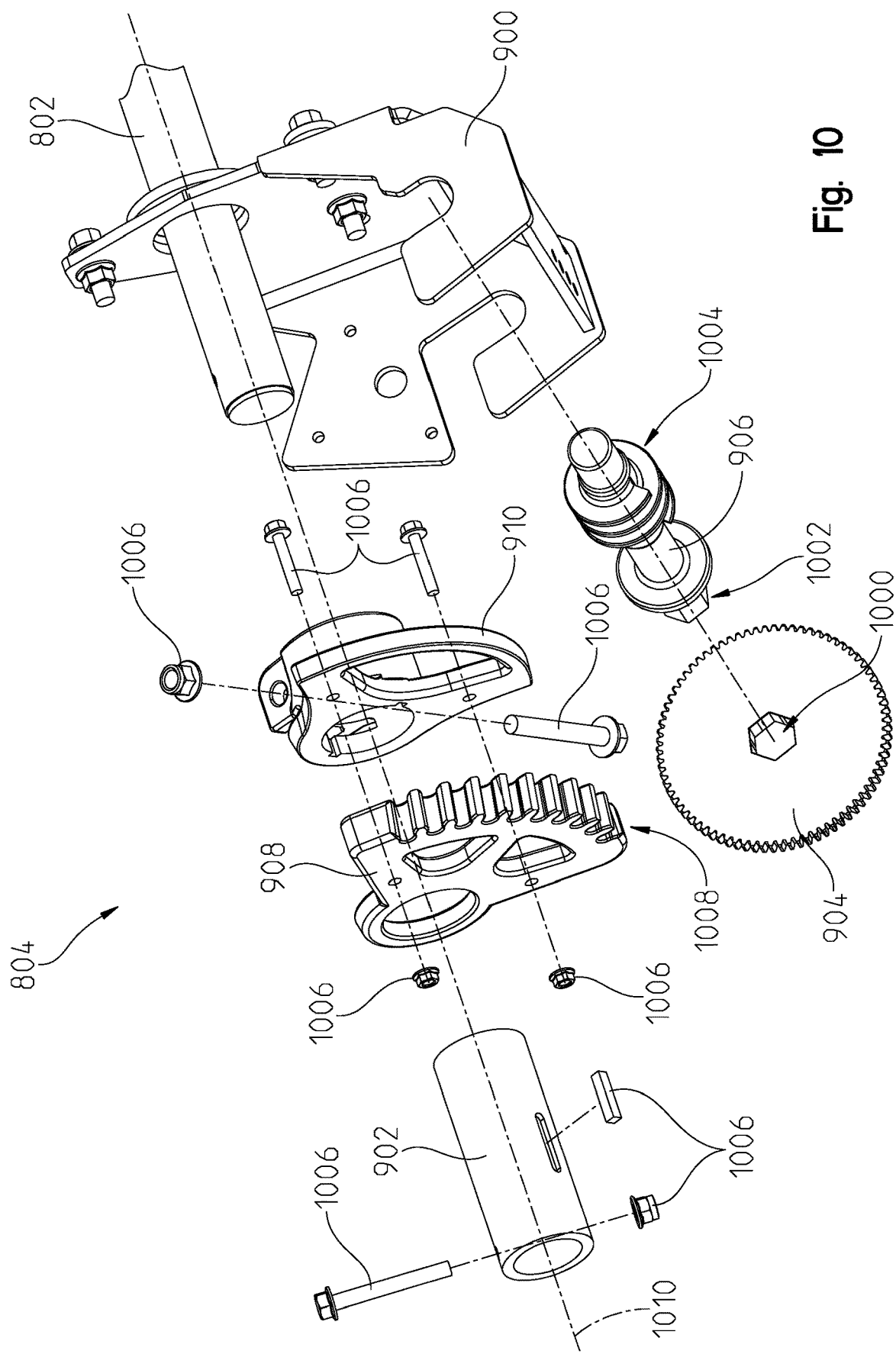
FIG. 10 is an exploded view of the drive mechanism of FIG. 9.

In FIGS. 9 and 10, the drive assembly 804 is shown in greater detail. Here, a bracket 900 may be mounted to the tank 800 such that the bracket 900 includes a bearing about which the drive shaft 802 rotates. The shaft 802 may rotate about a shaft axis 1010, as shown in FIG. 10. The bracket 900 is configured to receive a screw rod 906 which includes a first end and a second end. At the first end, the screw rod 906 may include a key-shaped end. The key-shaped end may be a hexagonal end as depicted in FIG. 10. Alternatively, the key-shaped end may be circular, triangular, square, pentagonal, octagonal, or any other type of shape.

A gear 904 with a plurality of teeth formed along an outer diameter thereof may be provided. The gear 904 may be operably drive by an electric motor or similar type of drive mechanism. The gear 904 may include a key-shaped opening which has a similar shape as the key-shaped end of the screw rod. In FIG. 10, for example, the gear 904 includes a hexagonal-shaped opening which receives the hexagonal end 1002 of the screw rod 906. As such, the gear 904 may be rotatably driven by the motor or other drive mechanism, and as it is, the gear 904 in turn may rotate the screw rod 906. The screw rod 906 may be disposed along an axis that is substantially perpendicular to the shaft axis 1010 in one aspect of the present disclosure. In another aspect, the screw rod 906 may be disposed along an axis that is angularly-disposed relative to the shaft axis 1010.

At or near the second end of the screw rod 906 is a threaded portion 1004. The threaded portion 1004 is configured to engage with a plurality of teeth 1008 formed on a gear member 908. As the screw rod 906 is rotated by the gear 904, the threaded portion 1004 may in turn rotate the gear member 908. The gear member 908 may be arranged about the drive shaft 802. As the gear member 908 is rotated by the screw rod 906, the gear member 908 in turn may rotate the drive shaft 802.

The drive assembly 804 may also include a sleeve 902 and support bearing 910 as shown in FIGS. 9 and 10. A plurality of fasteners 1006 may secure the sleeve 902 to the shaft 802 and the gear member 908 to the support bearing 910. Additional fasteners may be used to couple the support bearing to the shaft 802, as needed.

In the embodiment of FIGS. 8-10, the drive assembly 804 may be utilized when the plurality of doors or covers of a tank 800 are opened or closed either semi-automatically or manually. In other embodiments, however, the drive assembly 804 may be used for an entirely automated process. Regardless of how the plurality of doors or covers are opened or closed, the environmental sensing assembly 200 of the present disclosure may be rotated between its deployed and stowed positions automatically as the doors or covers are opened or closed. Thus, operator interaction to setup or install the assembly 200 in its deployed position, or to disassemble or remove the assembly during a transport mode is avoided by the present disclosure.

In a further aspect of the present disclosure, the rod 202 and sensor assembly 206 may be rotated or pivoted by the drive shaft 310, 802 less than the total amount of rotation of the drive shaft for opening or closing the respective tank door or cover. For instance, the rod 202 and sensor assembly 206 may rotate less than 100°, whereas the drive shaft rotates greater than 100°. In another example, the rod 202 and sensor assembly 206 may rotate less than 90° while the drive shaft rotates more than 110°. In a further non-limiting example, the rod 202 and sensor assembly 206 may rotate between 80-90°, and in one particular non-limiting example, the rod 202 and sensor assembly 206 may rotate approximately 85-88°.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A harvesting machine, comprising:
   a chassis;
   a ground-engaging mechanism for supporting the chassis;
   a grain tank assembly mounted to the chassis for storing a crop material, the grain tank assembly including a retractable door of the grain tank assembly, the retractable door having an open position and a closed position for covering an opening formed in a top of the grain tank assembly; and
   a mobile sensor assembly comprising a rod and a sensor for detecting a weather condition, the rod including a first end coupled to the retractable door and a second end coupled to the sensor;

wherein, the retractable door is operably moved between the open position and the closed position;

wherein, the mobile sensor assembly is rotatably moved between a deployed position and a stowed position as the door is moved between the open and closed positions, respectively.

2. The machine of claim 1, wherein in the closed position, the mobile sensor assembly is located in the grain tank assembly.

3. The machine of claim 1, wherein between the deployed position and the stowed position, the mobile sensor assembly is rotatably moved between 60-120°.

4. The machine of claim 1, wherein the mobile sensor assembly comprises an antenna, a camera, or a global positioning sensor.

5. The machine of claim 1, wherein the machine comprises a maximum height defined between a ground surface contacted by the ground-engaging mechanism and an uppermost location on the machine;

wherein, in the deployed position, the sensor is located at a height greater than the maximum height.

6. A harvesting machine, comprising:

a chassis;

a ground-engaging mechanism for supporting the chassis;

a tank assembly mounted to the chassis for storing a crop material, the tank assembly including a retractable door for covering an opening formed in a top of the tank assembly;

a mobile sensor assembly comprising a rod and a sensor for detecting a weather condition, the rod including a first end coupled to the retractable door and a second end coupled to the sensor;

wherein, the retractable door is operably moved between an open position and a closed position;

wherein, the mobile sensor assembly is rotatably moved between a deployed position and a stowed position as the door is moved between the open and closed positions, respectively; and further comprising a shaft rotatably driven by a drive mechanism, the shaft operably coupled to the door for rotating the door between the open and closed positions.

7. The machine of claim 6, wherein the mobile sensor assembly is coupled to the shaft, the mobile sensor assembly rotatably driven by the shaft between the deployed and stowed positions.

8. The machine of claim 7, wherein, as the retractable door is rotatably driven between the open and closed positions, the shaft rotates greater than 100° and the mobile sensor assembly is rotated less than 100°.

9. The machine of claim 6, further comprising a machine controller disposed in communication with the drive mechanism for operably controlling a rotational movement of the shaft and automatically moving the mobile sensor assembly between the deployed and stowed positions.

10. The machine of claim 6, further comprising a stop assembly comprising a first stopper mechanism and a second stopper mechanism;

wherein, in the deployed position, the rod engages the first stopper mechanism to prevent further rotational movement of the mobile sensor assembly;

wherein, in the stowed position, the rod engages the second stopper mechanism to prevent further rotational movement of the mobile sensor assembly.

11. The machine of claim 10, further comprising a sleeve for receiving the rod in the deployed position.

12. The machine of claim 10, wherein:

the rod is coupled to a block member, the block member including a stopper block and an opening formed in the block member for receiving the shaft;

the block member and rod being pivotable relative to the shaft such that the shaft rotates a greater angular distance than the mobile sensor assembly.

13. The machine of claim 6, wherein the drive mechanism comprises a hydraulic actuator or an electric motor.

14. The machine of claim 6, wherein in the closed position, the mobile sensor assembly is located in the tank assembly.

15. The machine of claim 6, wherein between the deployed position and the stowed position, the mobile sensor assembly is rotatably moved between 60-120°.

16. The machine of claim 6, wherein the mobile sensor assembly comprises an antenna, a camera, or a global positioning sensor.

17. The machine of claim 6, wherein the machine comprises a maximum height defined between a ground surface contacted by the ground-engaging mechanism and an uppermost location on the machine;

wherein, in the deployed position, the sensor is located at a height greater than the maximum height.

18. A harvesting machine, comprising:

a chassis;

a ground-engaging mechanism for supporting the chassis;

a tank assembly mounted to the chassis for storing a crop material, the tank assembly including a plurality of retractable doors for enclosing the tank assembly;

a drive assembly including a shaft operably coupled to at least one of the plurality of retractable doors, the drive assembly operably driving the at least one retractable door between an open position and a closed position;

a mobile sensor assembly comprising a rod, a sensor for detecting a weather condition, and a stop assembly for limiting rotational movement of the mobile sensor assembly, the rod including a first end coupled to the shaft and a second end coupled to the sensor;

wherein, the mobile sensor assembly is rotatably moved between a deployed position and a stowed position at approximately the same time as the door is moved between the open and closed positions, respectively.

19. The machine of claim 18, wherein, as the retractable door is rotatably driven between the open and closed positions, the shaft rotates greater than 100° and the mobile sensor assembly is rotated less than 100°.

20. The machine of claim 18, wherein:

the stop assembly comprises a first stopper mechanism and a second stopper mechanism;

wherein, in the deployed position, the rod engages the first stopper mechanism to prevent further rotational movement of the mobile sensor assembly;

wherein, in the stowed position, the rod engages the second stopper mechanism to prevent further rotational movement of the mobile sensor assembly.

* * * * *